Jan. 27, 1925.
C. W. KEUFFEL
COLOR ANALYZER
Filed Feb. 15, 1923
Fig. 2.
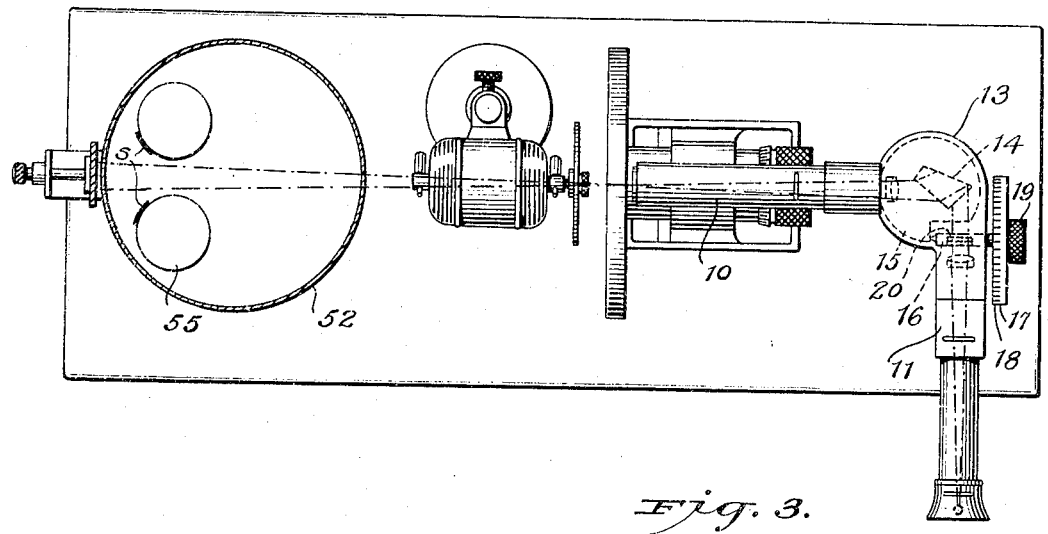
Fig. 3.
Fig. 1.
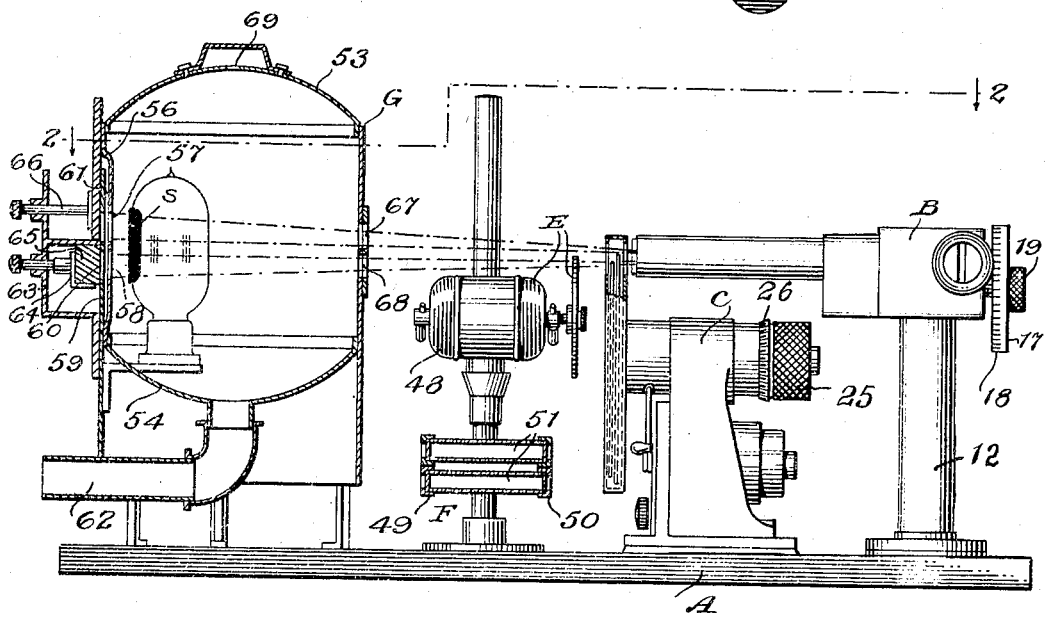
Inventor
Carl W. Keuffel
By his Attorneys

Patented Jan. 27, 1925.

1,524,180

UNITED STATES PATENT OFFICE.

CARL W. KEUFFEL, OF WEEHAWKEN, NEW JERSEY.

COLOR ANALYZER.

Application filed February 15, 1923. Serial No. 619,168.

*To all whom it may concern:*

Be it known that I, CARL W. KEUFFEL, a citizen of the United States, and a resident of Weehawken, in the county of Hudson and State of New Jersey, have made and invented certain new and useful Improvements in Color Analyzers, of which the following is a specification.

My invention relates to a color analyzer and has for its object to provide a color measuring instrument of the spectrophotometric type having all of the various units rigidly mounted upon a common base and accordingly permanently held in proper adjustment and alignment, and with the various parts so designed, arranged, combined and constructed that extremely accurate measurements of color may be made, rendering the instrument most desirable for laboratory investigations, and at the same time providing an instrument which is sufficiently rugged, durable and self-contained so that the measuring of colors may be readily performed under ordinary conditions such as experienced in a manufacturing establishment and whereby the analyzing and measuring of the color of an object becomes a comparatively simple matter and may be accurately carried out by an inexperienced observer.

A further object is to provide a practical direct reading color analyzer having improved means for powerfully and diffusely illuminating the sample so that accurate measurements may be made throughout the entire spectrum and novel means whereby the sample is maintained at an ordinary or normal temperature, this latter feature being of considerable importance not only where the color of an inflammable, easily charred or readily destroyed body is measured but also due to the slight changes in color which I have found take place in certain classes of samples when they are heated.

A further object is to provide convenient means whereby the accuracy and precision of the photometric and spectrometric scales may be readily checked, and, further, to accomplish all of the aforementioned ends in a simple and expeditious manner and accordingly place the analyzing, measuring and recording of the color of a solid, liquid or gas upon a practical basis and thus provide means for exact color specification or color control, and with the foregoing and other objects in view, my invention consists in the improved color analyzer illustrated in the accompanying drawings and hereinafter described and claimed, and in such variations and modifications thereof as will be obvious to those skilled in the art to which my invention relates, it being understood that changes may be made within the scope of what is claimed without departing from the spirit thereof.

The preferred embodiment of my invention is disclosed in the accompanying drawings, wherein:

Figure 1 is a view in side elevation and partially in section of the color analyzer embodying the characteristic features of my invention;

Figure 2 is a top plan view thereof;

Figure 3 is a diagrammatic view of the divided field for the photometric comparison.

Referring specifically to the several views, wherein similar reference numerals designate corresponding parts throughout, I provide a base A upon which is rigidly and permanently mounted a spectrometer B, a rotating disc photometer C, and adjacent which latter is arranged an auxiliary rotating sectored disc and motor E, the same being adjustably mounted and supported by the column F. Arranged at the remote end of the base A is rigidly secured the sample holding and illuminating member or light source G, all of which elements are accordingly held in proper and fixed relation and thus providing a compact, rugged and conveniently operable color analyzer.

The spectrometer B may be of any standard type, although preferably composed of the entrance tube or collimator 10 and the eye tube 11, both being properly supported by the column 12 and housing 13. Located within the housing is the usual type of constant deviation prism 14, the same being mounted upon a rotating platform or table 15, the movement thereof being controlled by the lead screw 16, which in turn is secured to the drum 17, and the latter has a suitable wave-length scale 18 inscribed thereon or carried thereby. A knurled knob 19 is attached to the drum and thus provides for the convenient manipulation of the prism.

The spectrometer is provided with suitable, and preferably adjustable, entrance slits and eye slits, and also includes the customary bi-prism 20, so that a divided field is obtained, as illustrated in Figure 3.

The photometer C is of the rotating disc type, the novel features of which have been made the subject-matter of a separate application. This photometer includes the knurled adjusting sleeve 25, the same carrying a suitable scale 26 whereby the quantity of light intercepted by the rotating discs may be regulated and measured.

Referring again to Figures 1 and 2, the auxiliary disc 46 is directly connected to the motor 48, which latter is adjustably mounted upon the stand F. The stand also provides a support for the adjustable holder 49 for liquid or for transparent substances, the adjustable holder being preferably composed of the frame 50 and the two tubes or troughs 51, which tubes or troughs are also provided with transparent end pieces.

The light source G is composed of an approximately spherical housing 52, 53, 54, the inner surface of which is coated with magnesium oxide or similar substance, so that bright and uniformly diffused illumination is obtained. Two adjustable stereopticon lamps 55 are so arranged as to highly illuminate the entire interior of the housing. It is highly important that the sample and standard be illuminated by uniform and diffused light and this is obtained by the approximately spherical formation of the housing and covers. Also I provide shields S preferably formed by an opaque paint placed directly upon the glass walls of the lamps and so arranged as to prevent the direct rays from the incandescent filament from reaching the sample and standard.

The rear wall of the housing is inwardly offset, as at 56, and is provided with the two spaced openings 57 and 58. A shield plate 59 is provided with openings 60 adapted to align and register with the openings 57 and 58 of the housing and is secured to the rear wall of the housing in such manner as to form a space 61 between the shield and offset wall 56. The shield 59 stops short of the upper end of the offset portion 56 of the housing, so that air may be drawn through a suction pipe 62 and will cause a current of air to enter between the offset wall 56 and shield 59 and thus flow downwardly through the space 61 and into the housing through the openings 57 and 58. This circulation of relatively cool air past the sample and standard maintains the same at a relatively cool or normal temperature and I am thus able to use a most powerful illuminating source. Further, this continuous cooling of the standard and sample allows the color of inflammable or easily charred bodies to be measured.

A sample holding bracket 63 is secured to the rear wall of the housing and is provided with the spring pressed carriage 64 arranged directly in front of the aligned openings 60 of the shield plate and 58 of the housing and is adapted to receive a solid object and hold it securely in front of the aligned openings. In Figure 1 this solid is represented as at 65, and is composed of a block of magnesium carbonate which is normally used as a standard for 100% reflection. The upper portion of the bracket 63 is provided with a second spring-pressed plunger 66 which is adapted to hold various types of samples in front of the aligned openings 61—57 of the shield plate and housing; the stereopticon lamps 55 being so arranged as to highly illuminate the sample and standard, cause a powerful beam of light to be reflected from the same and to pass out through suitable superposed openings 67 and 68 formed in the front wall of the housing. The cover of the housing is provided with a limited number of air inlet openings 69, so that as the air is withdrawn through the suction tube 62 the ventilation of the entire interior of the housing will take place, air being also allowed to enter through the limited openings 67 and 68.

My improved color analyzer as thus arranged and constructed may be easily and readily operated by an inexperienced observer, may be used to measure the color of inflammable or easily charred substances and provides for the most accurate and precise color measurements, and, further, allows this precision to be carried out for those colors of the spectrum which are of relatively low intensity. Also particular attention is called to the novel method of measuring colors by the powerful illumination of the same and at the same time preventing change of color due to change of temperature. Further, all of the units being rigidly secured to a common base, preserves the proper alignment thereof and allows the color analyzer to be used without any initial setting up or adjustment. Further, the color of a transparent object or liquid may be readily measured by placing the same within the transparent tubes or troughs 51 and inserting two magnesium carbonate blocks within the sample and standard holding bracket.

Having thus described my invention, I claim and desire to secure by Letters Patent

1. The method of testing or measuring the colors of a colored sample consisting in powerfully illuminating the same, providing a circulation of air past said sample and thereby preventing change of color due to change of temperature during the powerful illumination of the same, and then measuring or testing the colored light proceeding from said sample.

2. An instrument for measuring or testing colors of a colored sample comprising a support for said colored sample, means for diffusely and powerfully illuminating the same, means for causing a current of air to flow past said sample and prevent change of color due to change of temperature, and means for indentifying and measuring the colored lights proceeding from said sample.

3. A color analyzer comprising a spectrometer, a photometer associated therewith, means for supporting a sample and a comparison standard in proper position with relation thereto, a source of illumination, an opaque screen between said source of illumination and said sample and standard, means for illuminating said sample and standard by diffused light and allowing rays of light to pass directly from said standard and sample to said spectrometer and photometer.

4. A color analyzer comprising a spectrometer, a photometer associated therewith, means for supporting a sample and a comparison standard in proper position with relation to said spectrometer and said photometer, means for diffusely, equally and powerfully illuminating said sample and standard, and means for causing a current of air to flow across said sample and thereby prevent change of color due to change of temperature.

5. A color analyzer comprising a base, a light source mounted thereon, a holder for a sample and a standard associated with said light source, means mounted upon said base for photometrically and spectrometrically comparing the colored light from said standard and sample, and means for causing an inrush of air into said light source, past said sample, and thereby prevent change of color due to change of temperature.

6. An apparatus of the class described comprising a housing, a source of illumination therein, a holder adapted to support a sample and standard adjacent the rear wall, and means for causing a current of air to flow past said standard and sample between the same and the said rear wall and thence into the said housing, said housing provided with portions in the front wall thereof adapted to transmit the direct rays of light from said sample and standard, and means for measuring and comparing the direct rays of light from said housing.

7. A color analyzer comprising in part an approximately spherical housing, a holder associated with said housing and adapted to hold a sample and a comparison standard, a source of illumination located within said housing, and a screen located between said holder and said source of illumination and adapted to shield the standard and sample from the direct rays of said illumination, and means for causing a circulation of air past said standard and sample and into and through said housing for the cooling thereof.

Signed at Hoboken in the county of Hudson and State of New Jersey this 9th day of February A. D. 1923.

CARL W. KEUFFEL.

Witnesses:
 A. F. MENZER,
 B. B. VAN SICKLE.